(12) United States Patent
Lai et al.

(10) Patent No.: US 6,202,167 B1
(45) Date of Patent: Mar. 13, 2001

(54) COMPUTER CHIP SET FOR COMPUTER MOTHER BOARD REFERENCING VARIOUS CLOCK RATES

(75) Inventors: Jiin Lai, Taipei; Heng-Chen Ho, Da-Li; Kuo-Ping Liu, Taipei, all of (TW)

(73) Assignee: VIA Technologies, Inc., Taipei Hsien (TW)

(*) Notice: Subject to any disclaimer, the term of this patent is extended or adjusted under 35 U.S.C. 154(b) by 0 days.

(21) Appl. No.: 09/099,977

(22) Filed: Jun. 19, 1998

(30) Foreign Application Priority Data

Jan. 23, 1998 (TW) .................................... 87100972

(51) Int. Cl.$^7$ ........................................ G06F 1/08
(52) U.S. Cl. .............................................. 713/501
(58) Field of Search .................... 713/500, 501, 713/600, 1

(56) References Cited

U.S. PATENT DOCUMENTS

| | | | |
|---|---|---|---|
| 5,133,064 | * | 7/1992 | Hotta et al. ........................... 709/400 |
| 5,790,608 | * | 8/1998 | Benayoun et al. ................... 375/356 |
| 5,884,100 | * | 3/1999 | Norwoyle et al. ..................... 710/52 |

* cited by examiner

*Primary Examiner*—Thomas M. Heckler
(74) *Attorney, Agent, or Firm*—Thomas, Kayden, Horstemeyer & Risley (57) ABSTRACT

A computer chip set is devised for use on a computer mother board with at least two clock rates including a first clock rate and a second clock rate for the purpose of converting an input signal referencing either the first or second clock rate to an output signal referencing the other clock rate. The first and second clock rates are in virtual synchronism and have a fixed ratio between them. The computer chip set utilizes a phase signal generator capable of generating a set of phase signals and a signal conversion logic circuit for generating the output signal referencing one of the first and second clock rates other than the one referenced by the input signal. This computer chip set can allow the computer mother board to be operated without waiting a state so that the data processing efficiency of the computer mother board can be enhanced. A multiplexer means used in the computer chip set of the invention has an output which is selectively multiplexed between the first clock rate and the second clock rate to serve as a third clock signal. This computer chip set allows the designer to use a slower clock rate to drive the DRAM.

12 Claims, 9 Drawing Sheets

COMPUTER CHIP SET FOR COMPUTER MOTHER BOARD REFERENCING VARIOUS CLOCK RATES

CROSS-REFERENCE TO RELATED APPLICATION

This application claims the priority benefit of Taiwan application serial no. 87100972, filed Jan. 23, 1998, the full disclosure of which is incorporated herein by reference.

BACKGROUND OF THE INVENTION

1. Field of the Invention

This invention relates to chip sets for use on computer mother boards, and more particularly, to a computer chip set which is specifically devised for use on a computer mother board with various clock rates, so as to allow the computer mother board to utilize various clock rates to drive various data processing devices, such as a CPU and a memory unit, with high performance.

2. Description of Related Art

The central processing unit (CPU) is the heart of a personal computer. As a general rule, the performance of a CPU is largely dependent on the rate of the clock signal used to drive the CPU. In the old days, the clock rate for a CPU was only several megahertz, however, with advances in the semiconductor technology, the clock rate for a CPU nowadays has advanced to several hundred of megahertz. An old CPU with a low clock rate on a computer mother board can be upgraded to a new one with a higher clock rate simply by replacing the old CPU with the new one. However, one problem arises in that the associated devices working in conjunction with the CPU, such as DRAM (dynamic random access memory), may not be able to catch up with the faster speed provided by the new CPU. Therefore, the chip set for the computer mother board needs to be able to provide various clock rates that can be selected for use by the CPU. For instance, on a high-end computer mother board, either 100 MHz, 83 MHz or 66 MHz can be selected as the clock rate for the CPU. Either 100 MHz, 83 MHz, 66 MHz or 50 MHz can be selected as the clock rate for the DRAM. Either 66 MHz or 33 MHz can be selected as the clock rate for the PCI (Peripheral Component Interconnect) controller. Finally, either 133 MHz or 66 MHz can be selected as the clock rate for the AGP (Accelerated Graphics Port) controller.

When these devices are set to different clock rates, the transfer of data and signals among these devices can be a problem that can even cause the computer system to come to a dead halt. Therefore, a suitable interface means needs to be provided among these devices to handle the different clock rates.

A conventional solution to the foregoing problem is to let the CPU and the DRAM, regardless of the ratio between their clock rates, carry out one action at the appearance of each pulse until the action of the current pulse is completed. This causes a waiting state in the processing of the data and thus considerably degrades the performance.

Another conventional solution is to drive the CPU and the DRAM at the same clock rate. However, DRAMs that can be driven by as high a clock rate as the high-end CPUs are usually much more expensive to purchase. Since new CPUs are typically provided with cache memories, the use of a low-speed DRAM does not considerably affect the overall system performance. Hoverer, the use of a low-speed DRAM in conjunction with a high-speed CPU causes the computer system to be extremely unstable in operation. A system crash or dead halt can therefore occur.

Moreover, since electromagnetic radiation from electric appliances can be hazardous to health, a personal computer must pass the EMI (electromagnetic interference) test before it can be put on the market. The electromagnetic radiation emanating from a high-speed CPU is even higher in frequency and can cause an increased level of interference. To reduce the EMI effect, several solutions have been proposed, such as lowering the clock rate for the CPU and shortening the signal transmission path between the CPU and the DRAM. For high-speed CPUs, signal transmission paths can easily be shortened to reduce the EMI effect; however, for DRAMs, signal transmission paths can hardly be shortened since DRAMs are typically provided in modules that are mounted in dedicated slots on the mother board. Therefore, if the DRAM shares the same high clock rate for the CPU, the EMI problem will be quite serious.

In summary, conventional computer mother boards with various clock rates have the following drawbacks.

(1) First, the conventional method of letting the CPU and the DRAM carry out one action at the appearance of each pulse until the action of the current pulse is completed cause the computer to be very low in performance since a waiting state is required and wastes time.

(2) Second, since all sequence control situations need to be well considered in the design, a very broad boundary condition would cause the circuit to be highly complex in structure, difficult to debug, large in layout space and less cost-effective to manufacture.

(3) Third, if the DRAM shares the same high clock rate of the CPU, the EMI effect will be quite serious since the signal transmission paths for the DRAM can not be further shortened.

SUMMARY OF THE INVENTION

It is therefore an objective of the present invention to provide a computer chip set for use on a computer mother board with at least two clock rates for the purpose of converting one signal referencing the first clock rate to another signal referencing the second lock rate.

It is another objective of the present invention to provide a computer chip set for use on a computer mother board which allows the processing of data and signals referencing various clock rates to be highly efficient in operation and without a waiting state.

It is still another objective of the present invention to provide a computer chip set for use on a computer mother board which allows a memory unit to use a low clock rate other than the high clock rate used by the CPU so that cost for the memory unit can be reduced and the EMI effect from the memory unit can also be lessened, In accordance with the foregoing and other objectives of the present invention, a computer chip set for a computer mother board referencing various clock rates is provided. The computer chip set of the invention is specifically devised for use on a computer mother board with at least two clock rates including a first clock rate and a second clock rate for the purpose of converting an input signal referencing either of the first and second clock rates to an output signal referencing the other clock rate. The ratio of the first clock rate to the second clock rate is m:n where m and n are minimum positive integers and m>n. The first and second clock rates are in virtual synchronism in which the gap between the start time of the (i)th period of the first clock rate and the start time of the (i)th period of the second clock rate is less than a fixed time, wherein i and j are positive integer numbers.

The computer chip set of the invention comprises a phase signal generator capable of generating a set of m phase signals which are switched to an enable state in an alternating manner each exactly during one period of the first clock rate.

The computer mother board further includes a first subsystem referencing the first clock rate, a second subsystem referencing the second clock rate and a third subsystem referencing a third clock rate. The third clock rate is either the first clock rate or the second clock rate.

The computer chip set of the invention further comprises a logic circuit, which is coupled to receive the first clock rate, the second clock rate, the m phase signals and the input signal referencing either the first or second clock rates for the purpose of generating an output signal referencing the other clock rate.

The multiplexer means used in the computer chip set of the invention has an output which is selectively multiplexed between the first clock rate and the second clock rate to serve as a third clock signal.

Further, the computer mother board includes a first subsystem referencing the first clock rate; a second subsystem referencing the second clock rate; and a third subsystem referencing a third clock rate which is either the first clock rate or the second clock rate.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
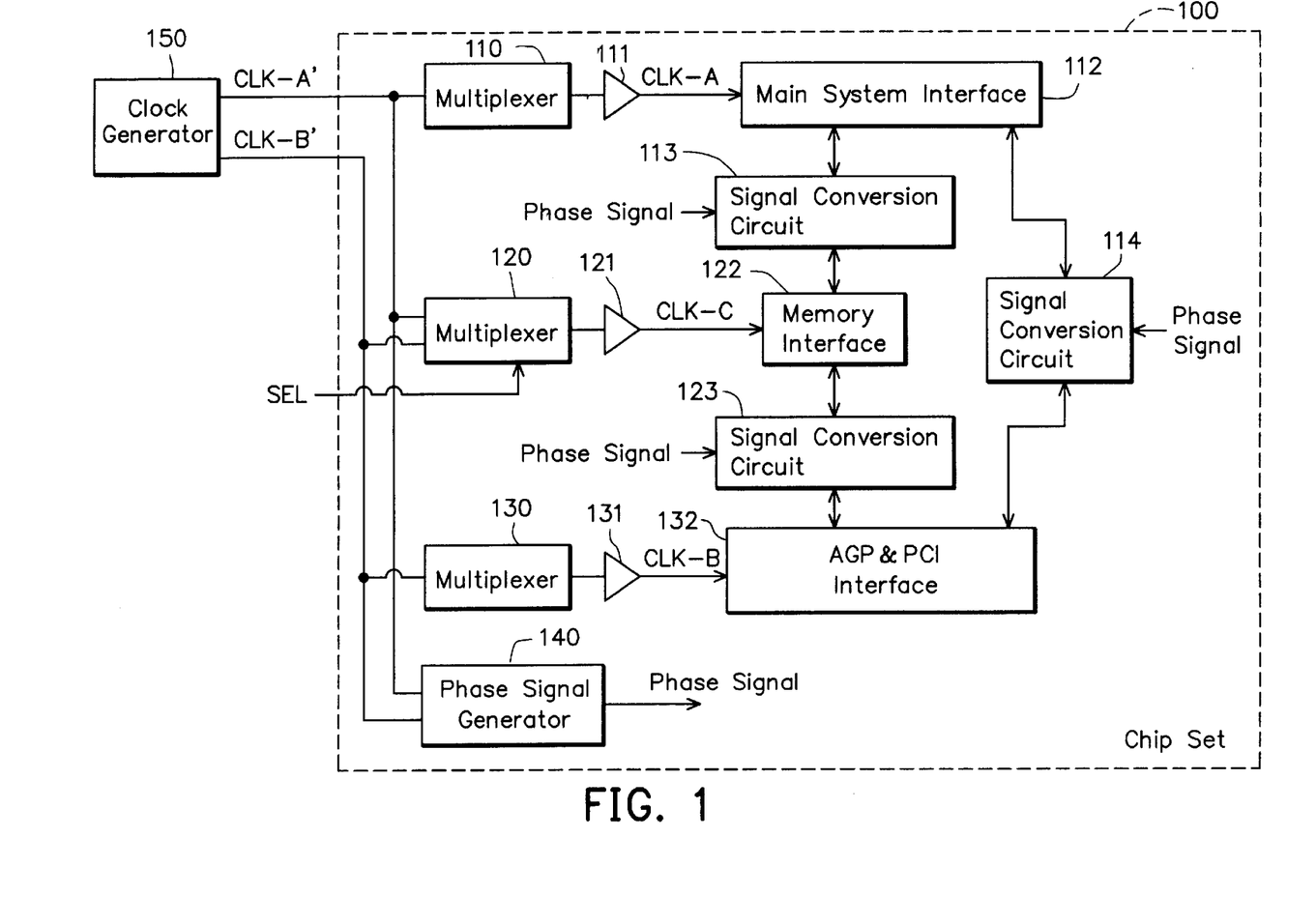
FIG.1 is a schematic block diagram showing the inside structure of the computer chip set of the ton for computer mother board referencing various clock rates.

FIG. 1 is a schematic block diagram showing the inside structure of the computer chip set of the invention (the circuit that is enclosed in a dashed box indicated by the reference numeral 100) which is specifically devised for use on a computer mother board with various clock rates, for example CLK-A' and CLK-B'. As shown, the computer chip set 100 includes a first multiplexer 110, a second multiplexer 120, a third multiplexer 130, a phase signal generator 140, a first buffer 111, a second buffer 121, a third buffer 131, a main system interface 112, a first signal conversion circuit 113, a second signal conversion circuit 114, a memory interface 122, a third signal conversion circuit 123 and an AGP/PCI interface 132. The computer chip set 100 is externally coupled to a clock generator 150 which is capable of generating two clock signals CLK-A' and CLK-B' of different clock rates but with a fixed ratio to the computer chip set 100. For example, if the CLK-A':CLK-B' ratio is 3:2 and CLK-A' is set at 100 MHz, then CLK-B' is 66 MHz; if the CLK-A':CLK-B' ratio is 4:3 and CLK-A' is set at 83 MHz, then CLK-B' is 66 MHz. In the following preferred embodiments of the invention, it will be assumed that the CLK-A':CLK-B' ratio is 3:2, meaning that three consecutive clock pulses in CLK-A' are equal in time length to two consecutive clocks pulses in CLK-B'.

The computer chip set 100 includes three subsystems: the main system interface 112, the memory interface 122, and the AGP/PCI interface 132. The clock generator 150 transfers CLK-A' via the first multiplexer 110 and the first buffer 111 (the output of the first buffer 111 is designated instead by CLK-A which is a delayed version of CLK-A') to the main system interface 112. Further, the clock generator 150 transfers both CLK-A' and CLK-B' to the second multiplexer 120, which is under control of the SEL selection signal to select either one of these two inputs as its output. The second multiplier 120 then transfers its output via the second buffer 121 (the output of the second buffer 121 is designated by CLK-C) to the memory interface 122. Still further, the clock generator 150 transfers CLK-B' via the third multiplexer 130 and the third buffer 131 (the output of the third buffer 131 is designated instead by CLK-B) to the AGP/PCI interface 132. The buffers I11, 121, 13 1 can provide higher current magnitudes for the respective interfaces 112, 122, 132. The SEL selection signal can be user-set through, for example, jumper means provided on the mother board, or through software settings in BIOS (Basic Input Output System) in the case of the computer being IBM-compatible. The first multiplexer 110 and the third multiplexer 130 serve as delay means for causing propagation delays respectively to the CLK-A' and CLK-B' clock signals in such a manner as to allow the output clock signals CLK-A and CLK-B to be substantially in synchronism with the output clock signal CLK-C from the second multiplexer 120.

The first signal conversion circuit 113 is provided between the main system interface 112 and the memory interface 122, the second signal conversion circuit 114 is provided between the main system interface 112 and the AGP/PCI interface 132, and the third signal conversion circuit 123 is provided between the memory interface 122 and the AGP/PCI interface 132. Further, the phase signal generator 140 takes both CLK-A' and CLK-B' from the clock generator 150 as inputs to generate a number of phase signals which are transferred to all of the signal conversion circuits 113, 114, 123.

The number of phase signals is determined in such a manner that it is equal to the highest value of the minimum integer rate between CLK-A' and CLK-B'. For example, if CLK-A':CLK-B'=3:2, then the number of phase signals will be 3, represented by PH1, PH2, and PH3. Moreover, each of the phase signals is clocked in accordance with the higher clock rate of CLK-A' and CLK-B'. One example of the waveform and timing of the phase signals with respect to CLK-A' and CLK-B' is shown in FIG. 2.

Figure 2:
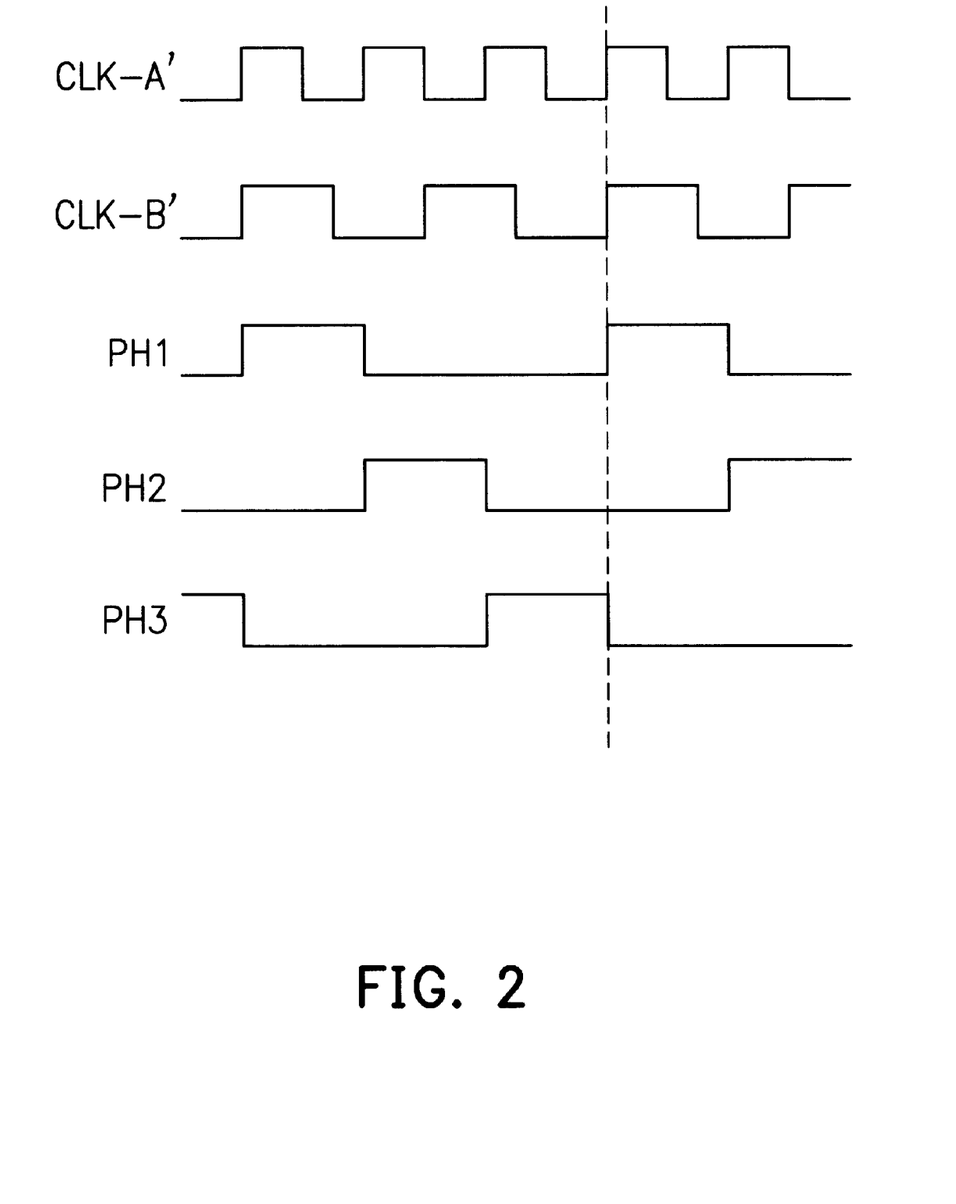
FIG. 2 is a waveform diagram showing the timing relationships among various signals utilized in the computer chip set of FIG. 1.

FIG. 2 shows the timing relationships between the two clock signals CLK-A', CLK-B' and the phase signals PH1, PH2, PH3 for the case of CLK-A':CLK-B'=3:2. In FIG. 2, it is assumed that CLK-A' and CLK-B' are virtually synchronized such that their first pulses appear at substantially the same time. Under this assumption, the subsequent (3N+1)th pulse of CLK-A' and the (2N+1)th pulse of CLK-B', where N is an integer and N≧1, will also appear at substantially the same time. However, in practice, a small lag can exist between CLK-A' and CLK-B'. This lag can be set within a tolerable range by design. As illustrated in FIG. 2, the first phase signal PH1 is switched to the high-voltage logic state during the first period and each subsequent (3N+1)th period of CLK-A', and remains at the low-voltage logic state otherwise. The second phase signal PH2 is switched to the high-voltage logic state during the second period and each subsequent (3N+2)th period of CLK-A' and remains at the low-voltage logic state otherwise. The third phase signal PH3 is switched to the high-voltage logic state during the third period and each subsequent (3N+3)th period of CLK-A' and remains at the low-voltage logic state otherwise.

Figure 3:
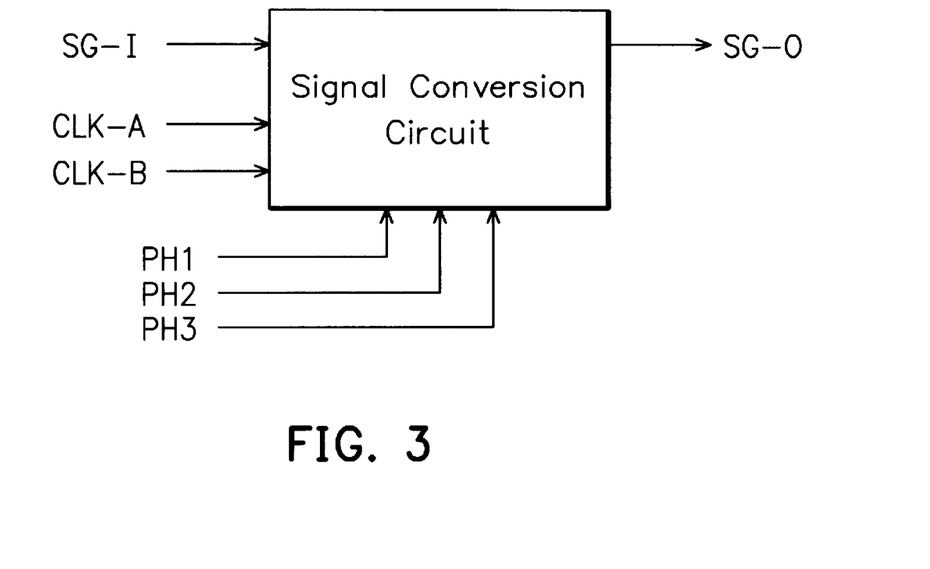
FIG. 3 is a schematic diagram showing the input/output signals to and from the signal conversion circuit utilized in the computer chip set of FIG. 1.

FIG. 3 is a schematic diagram showing the input/output signals of each of the signal conversion circuits 113, 114, 123 utilized in the chip set of FIG. 1. In FIG. 3, the symbol SG-I designates an input signal, which is referenced to either CLK-A or CLK-B, and the symbol SG-O designates the output signal from the signal conversion circuit, which is referenced to either CLK-A or CLK-B. However, the input signal SG-I and the output signal SG-O should be referenced to different clock signals. For example, if the input signal SG-I is referenced to CLK-A, then the output signal SG-O must be referenced to CLK-B. Contrarily, if the input signal SG-I is referenced to CLK-B, then the output signal SG-O must be referenced to CLK-A. The waveform and timing of the output signal SG-O are dependent on the input signal SG-I, the clock signals CLK-A, CLK and the phase signals PH1, PH2, PH3, which are to be detailed in the following.

Figure 4:
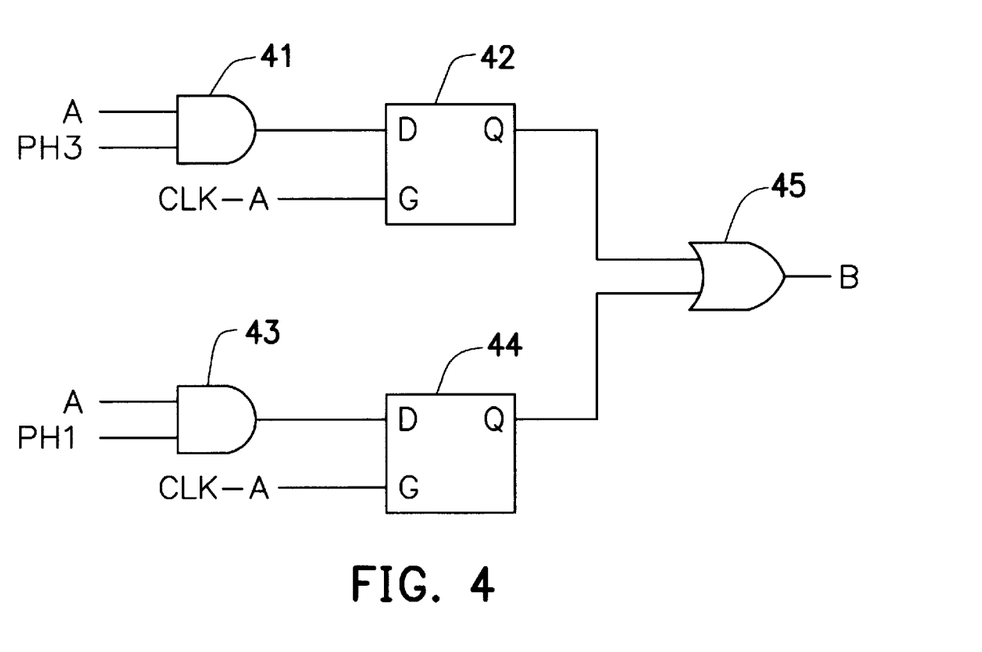
FIG. 4 is a schematic diagram of a preferred embodiment showing the inside structure of the signal conversion circuit of FIG. 3.

FIG. 4 is a schematic diagram showing the inside structure of a preferred embodiment of the signal conversion circuit of FIG. 3. As shown, the signal conversion circuit includes a first AND gate 41, a first transparent latch 42, a second AND gate 43, a econd transparent latch 44 and an OR gate 45. This signal conversion circuit only utilizes the clock signal CLK-A and two phase signals PH1, PH3 while CLK-B and PH2 are not in use. Further, the symbol A here designates an input signal referencing CLK-B and the symbol B designates an output signal referencing CLK-A. The first AND gate 41 has a first input end connected to receive the input A and a second input end connected to receive PH3. The first transparent latch 42 has a D input end connected to the output of the first AND gate 41, a G input end connected to receive CLK-A and a Q output end connected to one input end of the OR gate 45. The second AND gate 43 has a first input end connected to receive the input A and a second input end connected to receive PH1. The second transparent latch 44 has a D input end connected to the output of the second AND gate 43, a G input end connected to receive CLK-A and a Q output end connected to the other input end of the OR gate 45. When CLK-A is at a high-voltage logic state, the output of the first AND gate 41 is latched into the first transparent latch 42. Meanwhile the output of the second AND gate 43 is latched into the second transparent latch 44. The OR gate 45 then performs an OR-logic operation on the output of the first transparent latch 42 and the output of the second transparent latch 44 to thereby obtain the output B.

Figure 5A:
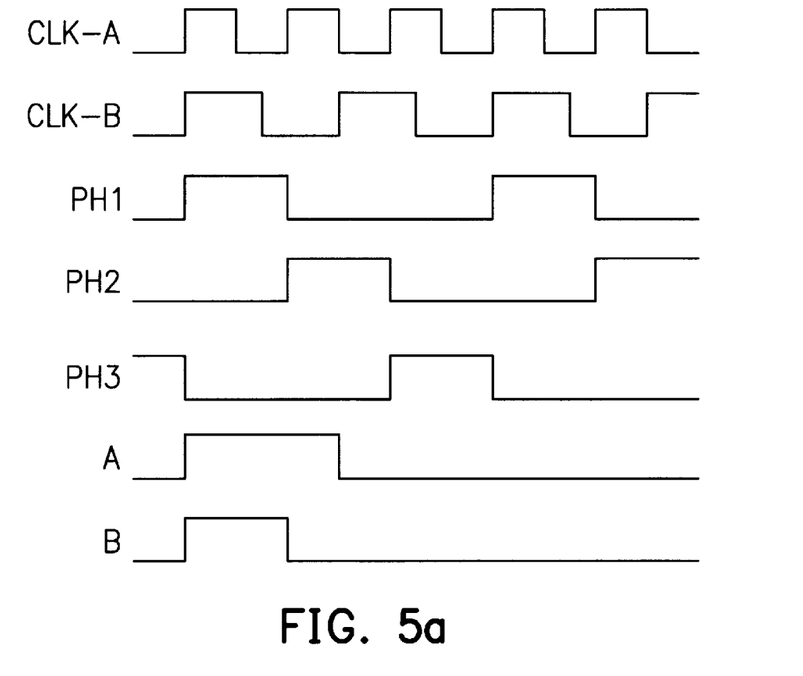
FIGS. 5a–5b are waveform diagrams of the various input/output signals processed by the signal conversion circuit of FIG. 4
Figure 5B:
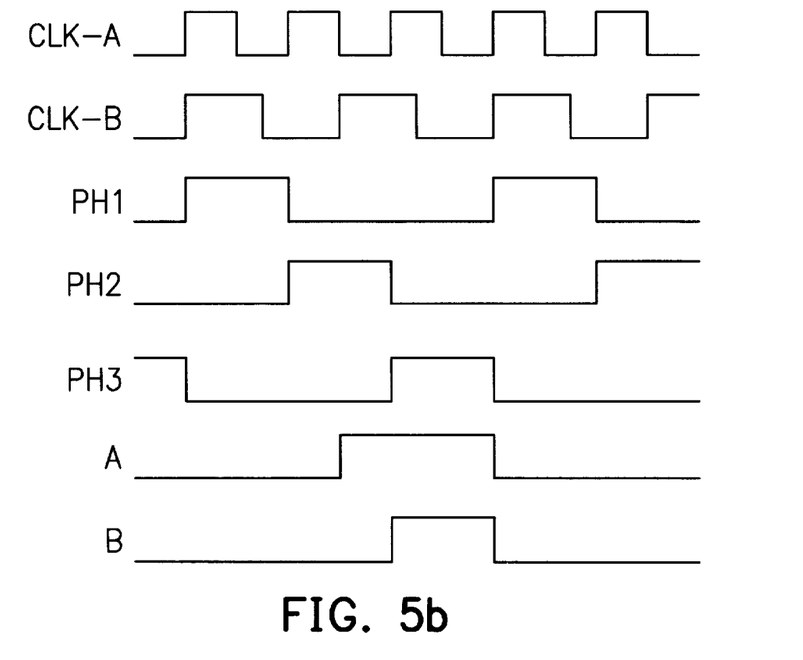

FIGS. 5a–5b are two examples of the waveform diagrams of the input/output signals CLK-A, CLK-B, PH1, PH2, PH3, A, and B of the signal conversion circuit of FIG. 4. In the examples of FIGS. 5a–5b, it is assumed that CLK-A':CLK-B'=3:2. The signal conversion circuit of FIG. 4 has two cases to discuss as respectively illustrated in FIG. 5a and FIG. 5b. Assume CLK-A and CLK-B are in virtual synchronism.

In the case of FIG. 5a, if the input signal A is at a high-voltage logic state during the first period of CLK-A, then the output signal B will follow the input signal A into high-voltage logic state. As shown in FIG. 4, the inputs to the AND gate 43 are PH1 and B. Thus, the input signal B will be maintained at the high-voltage logic state all the time during the first period of CLK-B and is maintained at the high-voltage logic state all the time during the first period of CLK-A, but then is switched back to the low-voltage logic state during the second period of CLK-A.

In the case of FIG. 5b, the input signal A is switched to the high-voltage logic state during the second period of CLK-B, but the output signal B will be switched to the high-voltage logic state later during the appearance of the third period of CLK-A and then immediately switched back to the low-voltage logic state at the appearance of the next period.

In the foregoing sequencing manner of the input/output signals, it should be apparent to those skilled in the art that delays can exist between A and CLK-B, and between B and CLK-A. These delays are neglected in the illustrated waveform diagram, but in practice, the designer should well consider these delays in design so that the circuit does not suffer from dead halts.

The waveform diagrams of FIGS. 5a–5b allow the designer to learn where there are wasted periods in the timings of the input/output signals. In the case of FIG. 5a, the output signal B appears all during the time the input signal A appears, so that no periods are wasted. In the case of FIG. 5b, however, the second period of CLK-B starts at the middle of the second period of CLK-A, and the output B is being switched to the high-voltage logic state at the start of the third period of CLK-A. As a result, half of one period of CLK-A has been wasted.

Figure 6:
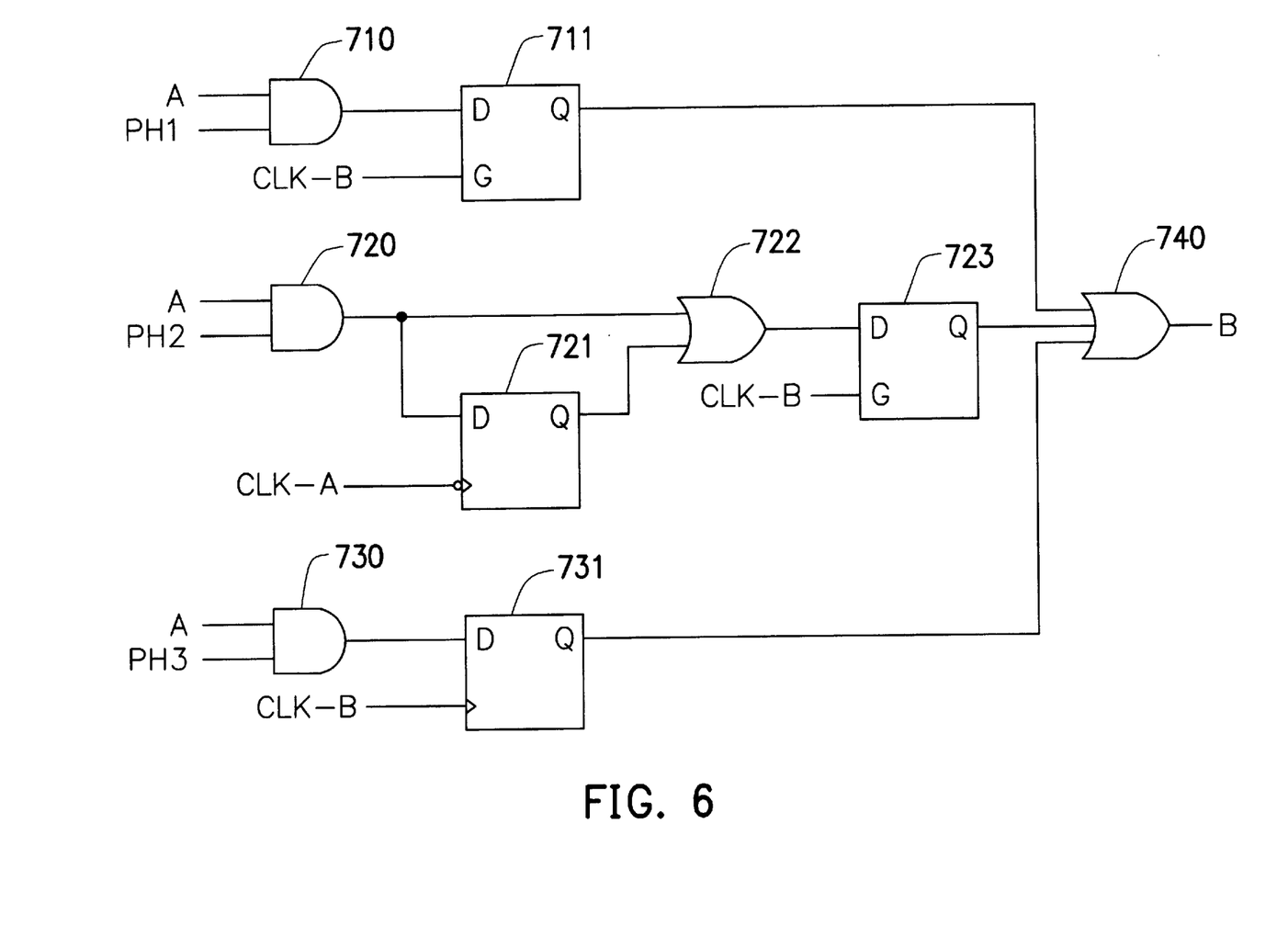
FIG. 6 is a schematic diagram of a preferred embodiment of the signal conversion circuit.

FIG. 6 is a schematic diagram of a signal conversion circuit, which is devised to convert an input signal A referencing CLK-A to an output signal B referencing CLK-B. As shown, the signal conversion circuit includes a first AND gate 710, a second AND gate 720, a third AND gate 730, a first transparent latch 711, a first D-type flip-flip 721, a second D-type flip-flip 731, a first OR gate 722, a second transparent latch 723 and a second OR gate 740. In this signal conversion circuit, all the inputs, i.e., CLK-A, CLK-B, PH1, PH2, and PH3, are used. This signal conversion circuit includes three main processing parts respectively associated with PH1, PH2, and PH3. In the part for PH1, when CLK-A is at the high-voltage logic state, it causes the first transparent latch 711 to latch the output of the first AND gate 710, which is the result of the AND-logic operation on A and PH1. In the part for PH2, when CLK-A is at a falling edge, it causes the first D-type flip-flip 721 to latch the output of the second AND gate 720, which is the result of the AND-logic operation on A and PH2. Next, the first OR gate 722 performs an OR-logic operation on the output of the first D-type flip-flip 721 and the output of the second AND gate 720. Then, when CLK-B is switched to the high-voltage logic state, it causes the second transparent latch 723 to latch the output of the first OR gate 722. In the part for PH3, when CLK-B is at a rising edge, it causes the second D-type flip-flip 731 to latch the output of the third AND gate 730 which is the result of the AND-logic operation on A and PH3. Finally, the second OR gate 740 performs an OR-logic operation on the output of the first transparent latch 711, the output of the second transparent latch 723, and the output of the second D-type flip-flip 731. The output of the second OR gate 740 is the output signal B.

Figure 7A:
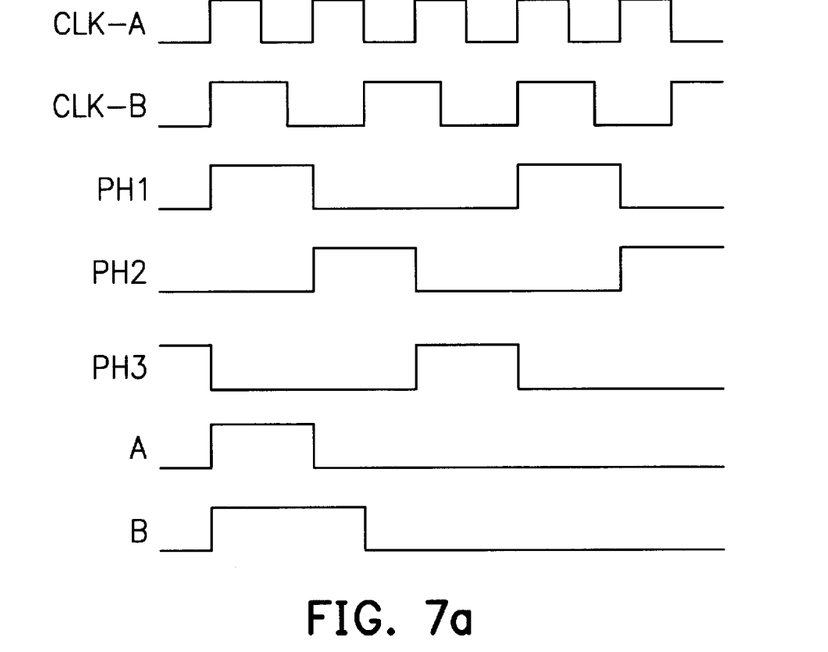
FIGS. 7a–7b are waveform diagrams of the various input/output signals processed by the signal conversion circuit of FIG. 6.
Figure 7B:
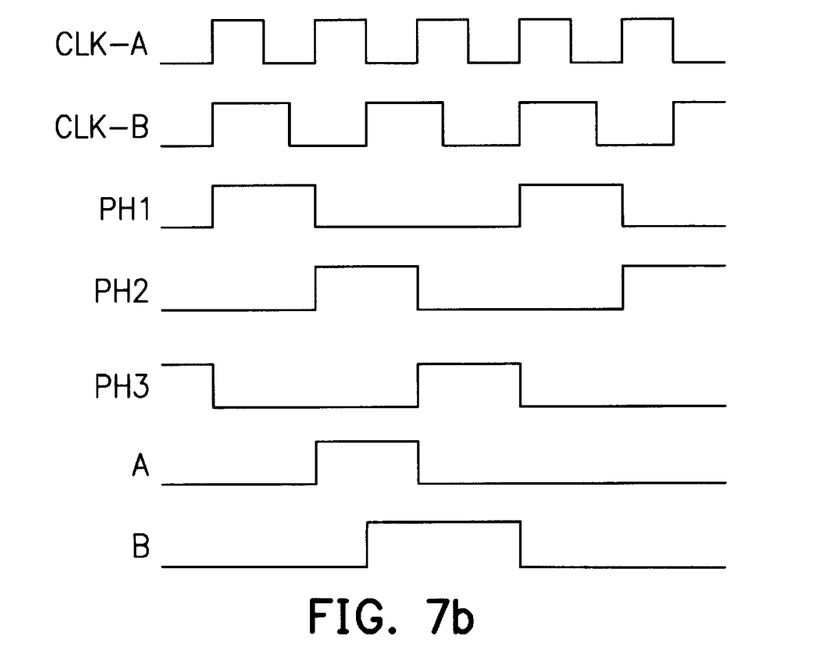
Figure 7C:
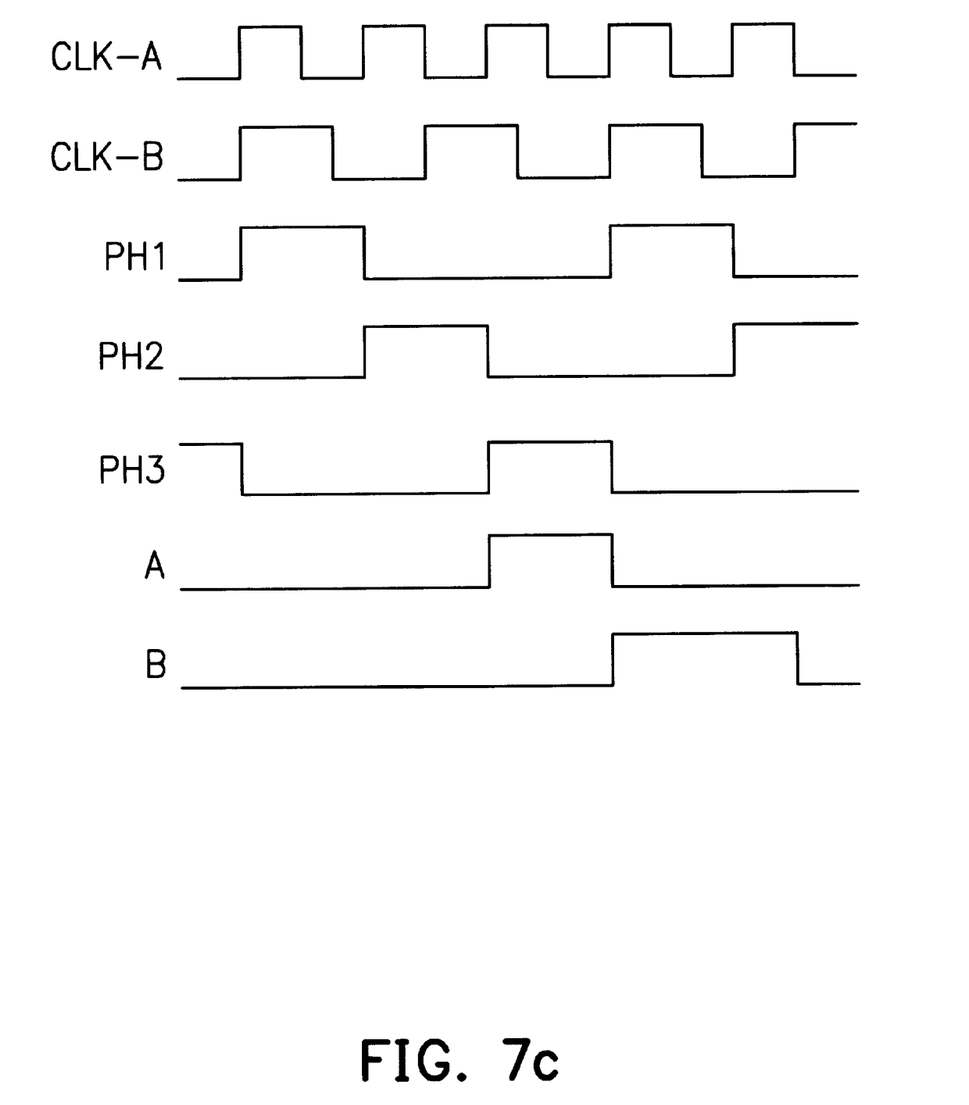

Due to the clock rate ratio and virtual synchronism between CLK-A and CLK-B, the timing of the input/output signals in FIG. 6 has three cases to discuss respectively illustrated in FIGS. 7a–7c. In the case of FIG. 7a, the input signal A is switched to high-voltage logic state during the first period of CLK-A, which then causes (through the first AND gate 710 and the first transparent latch 711 in FIG. 6) the output signal B to be switched to and remains at the high-voltage logic state throughout the first period of CLK-B. In the case of FIG. 7b, the input signal A is switched to the high-voltage logic state during the second period of CLK-A, which then causes (through the second AND gate 720, the first D-type flip-flip 721, the first OR gate 722, and the second transparent latch 723 in FIG. 6) the output signal B to be switched to and maintained at the high-voltage logic state throughout the second period of CLK-B. In the case of FIG. 7c, the input signal A is switched to the high-voltage logic state during the third period of CLK-A, which then causes (through the third AND gate 730 and the second D-type flip-flip 731 in FIG. 6) the output signal B to be switched to and maintained at the high-voltage logic state throughout the third period of CLK-B.

In the foregoing case of FIG. 7a, since the output signal B follows the input signal A into the high-voltage logic state, no clock periods have been wasted. In the case of FIG. 7b, since the second period of CLK-B starts at the middle of the second period of CLK-A and the output signal B starts to switch state at the beginning of the second period of CLK-B, half of one period of CLK-A has been wasted. In the case of FIG. 7c, since at the start of the third period of CLK-A, half of the second period of CLK-B is not even yet completed and the output signal B starts to switch state after the second period of CLK-B is completed, one period of CLK-A has been wasted.

In conclusion, for the five cases discussed in FIGS. 5a–5b and FIGS. 7a–7c, the best condition would be that in which no waiting states are required. Of these five cases, two cases involve no waiting states, two other cases require a waiting state for half of one period, and one case requires a waiting state for one complete period. Compared to the prior art in which at least one period is wasted, it is apparent that the invention is more advantageous.

Figure 8:
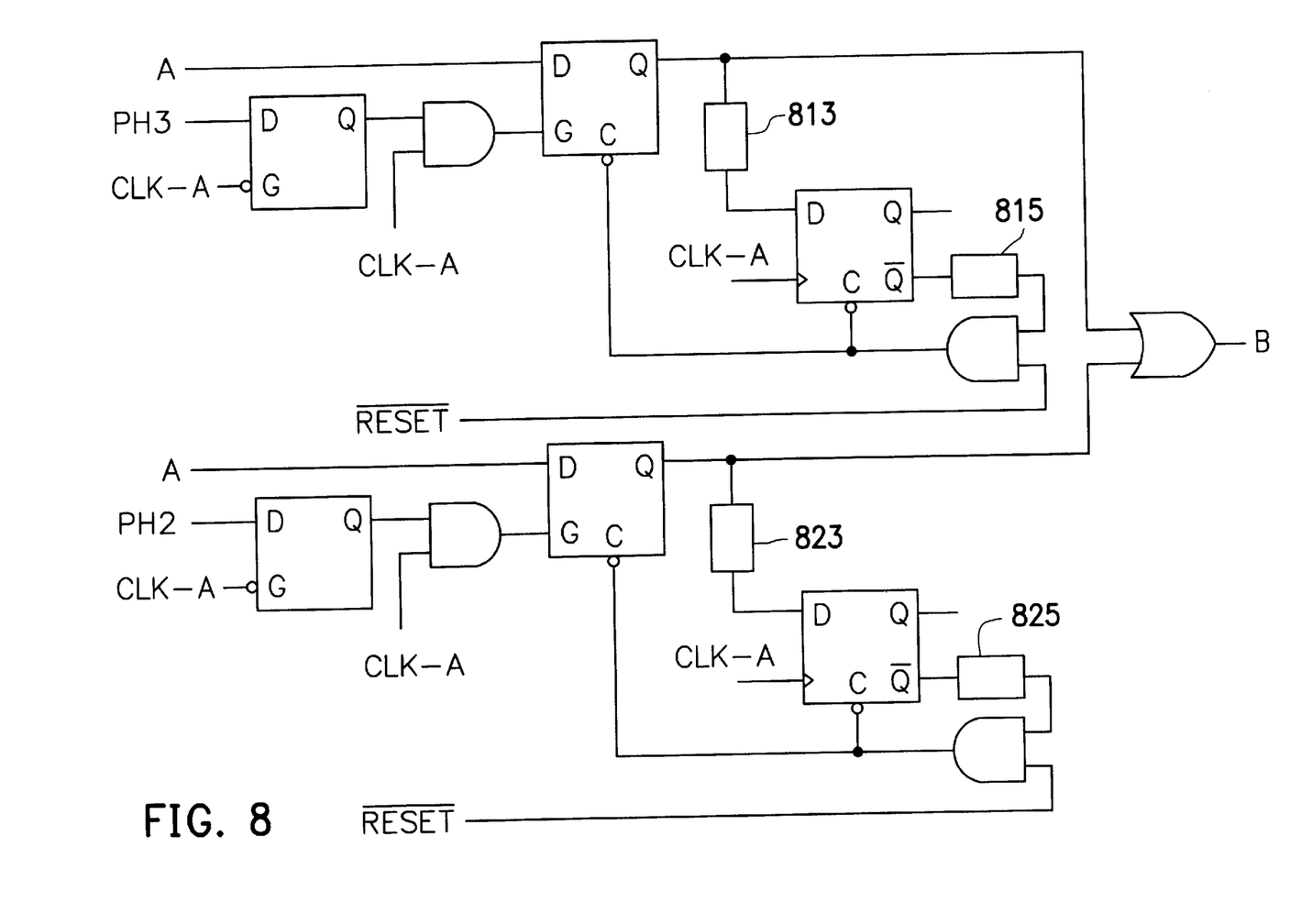
FIG. 8 is a schematic diagram of another preferred embodiment of the signal conversion circuit which is additionally provided with reset means.
Figure 9:
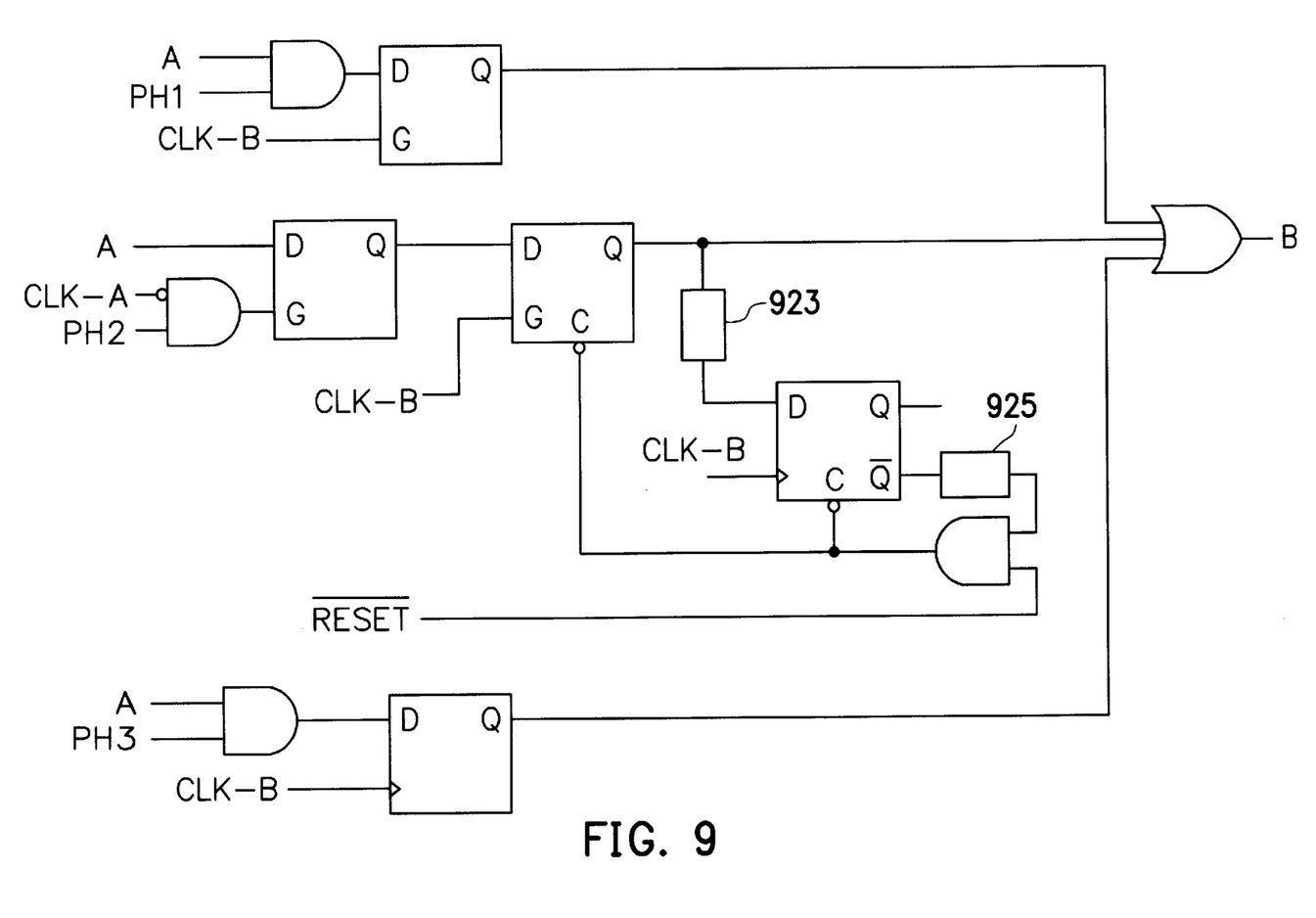
FIG. 9 is a schematic diagram of still another preferred embodiment of the signal conversion circuit, which is additionally provided with reset means.

FIG. 8 and FIG. 9 show another preferred embodiments of the signal conversion circuit of the invention. In these signal conversion circuits, RESET signals and associated circuitry are incorporated to allow the signal conversion circuit to be reset to initial states when the computer system is just being started. As shown, the signal conversion circuit includes several delay means 813, 815, 823, 825, 923 and 925.

From the forgoing description, it can be learned that the computer chip set of the invention has the following several advantages over the prior art.

First, the invention utilizes virtual synchronism among the various clock signals to reduce or even eliminate the waiting state in the signal processing, thus allowing a computer mother board that uses multiple clock rates to process data with more efficiency.

Second, the invention provides a specific signal sequencing scheme that allows the circuit to be designed with less complexity and layout space, and is easy to debug. The manufacture and utilization are thus more cost-effective.

Third, the invention allows the DRAM and CPU on a computer mother board to be driven by two different clock rates, or more specifically, allows the designer to drive DRAM with a slower clock rate than that used to drive the CPU, so that the EMI effect can be further reduced to meet standard EMI test standards.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A computer chip set which references at least three clock rates including a first clock rate, a second clock rate, and a third clock rate, the computer chip set comprising:

a first interface which references the first clock rate;

a second interface which references the second clock rate;

a third interface which references the third clock rate; and a clock multiplexer, coupled to the third interface, for selectively multiplexing either the first clock rate or the second clock rate as the third clock rate to clock the third interface.

2. The computer chip set of claim 1, wherein the third interface is a memory interface.

3. The computer chip set of claim 2, further comprising:

a first delay multiplexer, coupled to the first interface, for delaying the signal of the first clock rate by a predetermined first propagation delay that allows the delayed version of the first clock signal to be substantially synchronized with the third clock rate; and a second delay multiplexer, coupled to the second interface, for delaying the signal of the second clock rate by a predetermined second propagation delay that allows the delayed version of the second clock signal to be substantially in synchronism with the third clock rate.

4. The computer chip set of claim 3, wherein the ratio of the first clock rate to the second clock rate is m:n where m and n are minimum positive integers and m>n, the first and second clock rates are in virtual synchronism with each other, the time lag between the start time of the (i)th period of the first clock rate and the start time of the (j)th period of the second clock rate is less than a preset duration, and i, j are positive integer numbers; and the computer chip set further comprises a signal conversion circuit, coupled to any two of the first, second, and third interfaces, capable of converting the output signal from one interface in-rate for acceptance by the other interface based on the clock ratio and virtual synchronism between the first clock rate and the second clock rate.

5. The computer chip set of claim 4, wherein the time lag is preset at zero, allowing the (i)th period of the first clock rate and the (j)th period of the second clock rate to start at substantially the same time.

6. The computer chip set of claim 4, further comprising a phase signal generator, coupled to the signal conversion circuit, for generating a set of phase signals for use by the signal conversion circuit.

7. The computer chip set of claim 6, wherein the number of the phase signals is m, which are alternately switched to an enable state each exactly in synchronism with one of the m periods of the first clock rate.

8. A computer chip set which references at least three clock rates including a first clock rate, a second clock rate, and a third clock rate, the computer chip set comprising:
- a first delay multiplexer for delaying the signal of the first clock rate by a predetermined first propagation delay that allows the delayed version of the first clock signal to be substantially synchronized with the third clock rate;
- a second delay multiplexer for delaying the signal of the second clock rate by a predetermined second propagation delay that allows the delayed version of the second clock signal to be substantially synchronized with the third clock rate;
- a first interface coupled to receive the output of the first delay multiplexer to be clocked by the output of the first delay multiplexer;
- a second interface coupled to receive the output of the second delay multiplexer to be clocked by the output of the second delay multiplexer;
- a clock multiplexer, coupled to the third interface, for selectively multiplexing one of the first clock rate and the second clock rate as the third clock rate; and
- a third interface which references the third clock rate.

9. The computer chip set of claim 8, wherein the third interface is a memory interface.

10. A method for use on a computer chip set for a computer mother board that references three clock rates including a first clock rate, a second clock rate, and a third clock rate, the computer chip set including at least a first interface, a second interface, and a third interface, the method comprising the steps of
- delaying the signal of the first clock rate by a predetermined first propagation delay;
- clocking the first interface with the delayed version of the first clock signal;
- delaying the signal of the second clock rate by a predetermined second propagation delay;
- clocking the second interface with the delayed version of the second clock signal;
- selectively multiplexing either the first clock rate or the second clock rate to serve as the third clock rate; and
- clocking the third interface with the third clock rate.

11. The method claim 10, wherein the third interface is a memory interface.

12. The method claim 10, wherein the first propagation delay delays the first clock rate to be substantially synchronized to the third clock rate, while the second propagation delay delays the second clock rate to be substantially synchronized to the third clock rate.

* * * * *